(12) United States Patent
Ren et al.

(10) Patent No.: US 10,509,247 B2
(45) Date of Patent: Dec. 17, 2019

(54) BACK PANEL ASSEMBLY AND DISPLAY DEVICE HAVING THE SAME

(71) Applicant: BOE TECHNOLOGY GROUP CO., LTD., Beijing (CN)

(72) Inventors: Yan Ren, Beijing (CN); Zifeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 67 days.

(21) Appl. No.: 15/538,187

(22) PCT Filed: Oct. 21, 2016

(86) PCT No.: PCT/CN2016/102853
§ 371 (c)(1),
(2) Date: Jun. 20, 2017

(87) PCT Pub. No.: WO2017/128777
PCT Pub. Date: Aug. 3, 2017

(65) Prior Publication Data
US 2018/0275446 A1  Sep. 27, 2018

(30) Foreign Application Priority Data
Jan. 29, 2016 (CN) .......................... 2016 1 0065229

(51) Int. Cl.
*G02F 1/1333* (2006.01)
*H04N 5/64* (2006.01)
(Continued)

(52) U.S. Cl.
CPC .... *G02F 1/133308* (2013.01); *G02F 1/13452* (2013.01); *G11B 33/02* (2013.01);
(Continued)

(58) Field of Classification Search
CPC ................................................. G02F 1/133308
See application file for complete search history.

(56) References Cited

U.S. PATENT DOCUMENTS 3,568,263 A * 3/1971 Meehan .................. H05K 7/12
269/91
2005/0128714 A1* 6/2005 Lee ...................... H01L 23/4093
361/719
(Continued)

FOREIGN PATENT DOCUMENTS

CN 101303464 A 11/2008
CN 101487952 * 7/2009 ......... G02F 1/13357
(Continued)

OTHER PUBLICATIONS

International Search Report and Written Opinion dated Feb. 6, 2017, for corresponding PCT Application No. PCT/CN2016/102853.
(Continued)

*Primary Examiner* — Sang V Nguyen
(74) *Attorney, Agent, or Firm* — Kinney & Lange, P.A.

(57) ABSTRACT

The present disclosure provides a back panel assembly including a back panel and a circuit board disposed on the back panel, the back panel includes: a first plate, a second plate opposite to the first plate and an insulating material layer interposed between the first and second plates, the second plate includes a cutout portion such that the insulating material layer have an exposed portion exposed by the cutout portion; and the circuit board is disposed on the exposed portion of the insulating material layer. The present disclosure also provides a display device. The display device includes a display panel and the above back panel assembly, the display panel is positioned on a side of the first plate of the back panel, and the circuit board is configured to control the display panel.

10 Claims, 8 Drawing Sheets

(51) Int. Cl.
  *G11B 33/02* (2006.01)
  *G02F 1/1345* (2006.01)
(52) U.S. Cl.
  CPC ... *H04N 5/64* (2013.01); *G02F 2001/133314* (2013.01); *G02F 2001/133317* (2013.01); *G02F 2201/465* (2013.01)

(56) References Cited

U.S. PATENT DOCUMENTS

| | | | | |
|---|---|---|---|---|
| 2005/0206801 | A1* | 9/2005 | Miura | G06F 1/1605 349/58 |
| 2006/0189196 | A1* | 8/2006 | Kameda | H05K 7/1417 439/326 |
| 2008/0239193 | A1* | 10/2008 | Jang | G02F 1/133308 349/58 |
| 2009/0015736 | A1* | 1/2009 | Weller | B60R 1/12 349/11 |
| 2010/0093197 | A1* | 4/2010 | Sander | H01R 12/585 439/82 |
| 2010/0295443 | A1* | 11/2010 | Roberts | H01L 51/5203 313/504 |
| 2012/0018861 | A1* | 1/2012 | Kozaka | H01L 23/36 257/668 |
| 2013/0107156 | A1* | 5/2013 | Zhou | G02F 1/133308 349/58 |
| 2014/0217382 | A1* | 8/2014 | Kwon | H01L 51/0097 257/40 |
| 2015/0200603 | A1* | 7/2015 | Nam | H02M 5/4585 363/37 |
| 2015/0313045 | A1* | 10/2015 | Jin | B29C 45/14639 361/748 |
| 2015/0369467 | A1* | 12/2015 | Saito | H05K 3/305 362/345 |
| 2016/0268073 | A1* | 9/2016 | Huang | H01H 13/702 |
| 2017/0040406 | A1* | 2/2017 | Park | H01L 27/3276 |

FOREIGN PATENT DOCUMENTS

| | | | | |
|---|---|---|---|---|
| CN | 101487952 | A | 7/2009 | |
| CN | 101571644 | * | 11/2009 | G02F 1/13 |
| CN | 101571644 | A | 11/2009 | |
| CN | 201383571 | Y | 1/2010 | |
| CN | 201639694 | U | 11/2010 | |
| CN | 102384442 | A | 3/2012 | |
| CN | 202182991 | U | 4/2012 | |
| CN | 102439753 | A | 5/2012 | |
| CN | 103364974 | A | 10/2013 | |
| CN | 103779378 | A | 5/2014 | |
| CN | 204481949 | U | 7/2015 | |
| CN | 105227875 | A | 1/2016 | |
| CN | 105467648 | A | 4/2016 | |
| CN | 205353509 | U | 6/2016 | |
| KR | 20060053393 | A | 5/2006 | |
| KR | 20170018184 | * | 2/2017 | H01L 27/32 |

OTHER PUBLICATIONS

First Chinese Office Action & Search Report, for Chinese Patent Application No. 2016100652292, dated Feb. 24, 2018, 20 pages.
Second Chinese Office Action & Search Report, for Chinese Patent Application No. 201610065229.2, dated Aug. 8, 2018.

* cited by examiner

A-A

B-B

BACK PANEL ASSEMBLY AND DISPLAY DEVICE HAVING THE SAME

CROSS-REFERENCE TO RELATED APPLICATION

This application claims the benefit of Chinese Patent Application No. 201610065229.2 filed on Jan. 29, 2016 in the State Intellectual Property Office of China, the whole disclosure of which is incorporated herein by reference.

TECHNICAL FIELD

The present disclosure relates to a field of manufacturing a display apparatus, and specifically relates to a back panel assembly and a display device having the same.

DESCRIPTION OF THE RELATED ART

Liquid crystal display devices have become increasingly popular. With the development of technology and requirements of consumers to products in respect of a light weight, a thin thickness and the like, the display device tends to be lighter and thinner. In order to further reduce the thickness of the display device, the presently known means include: manufacturing a housing and/or a back panel of a display device from a metal material, an alloy material, a metal composite material, etc., which can be machined to be thinner and can provide a sufficient structural strength when compared with a conventional plastic material; decreasing the internal space of the display device as much as possible; leading a portion of a control circuit of the display panel out from the inside of the display device and positioning the portion at a proper location on the back panel of the display device, and so on.

The mounting methods in the prior art require additional fixed operation (adhering, bolt fixing), so it is not beneficial to improvement of assembly efficiency.

SUMMARY

According to an aspect of the present disclosure, there is provided a back panel assembly.

According to an exemplary embodiment, a back panel assembly comprising: a back panel; and a circuit board disposed on the back panel, wherein the back panel comprises: a first plate; a second plate opposite to the first plate; and an insulating material layer interposed between the first and second plates. The second plate comprises a cutout portion such that the insulating material layer comprises an exposed portion exposed by the cutout portion; and the circuit board is disposed on the exposed portion of the insulating material layer.

According to an exemplary embodiment, a fixing member is formed on the exposed portion of the insulating material layer and configured to fix the circuit board.

According to an exemplary embodiment, the fixing member comprises a snap structure, and the circuit board is provided with a first hole cooperating with the snap structure.

According to an exemplary embodiment, the fixing member is formed integrally with the insulating material layer.

According to an exemplary embodiment, a positioning member is also formed on the exposed portion of the insulating material layer and configured to position the circuit board.

According to an exemplary embodiment, the positioning member comprises a columnar protrusion, and the circuit board is provided with a second hole cooperating with the columnar protrusion.

According to an exemplary embodiment, the first and second plates are each made of a conductive material.

According to an exemplary embodiment, materials of the first and second plates are any one selected from a group consisting of aluminum, aluminum alloy, magnesium alloy, aluminum magnesium alloy, stainless steel, and carbon fiber composite material or any combination thereof; and the material of the insulating material layer is any one selected from a group consisting of polycarbonate CPC), acrylonitrile-butadiene-styrene copolymer (ABS), polyethylene (PE), a mixture of PC and ABS, a mixture of polyvinyl chloride (PVC) and ABS, a mixture of NYLON and ABS, and a composite material of PC and fiberglass, or any combination thereof.

According to an exemplary embodiment, thicknesses of the first plate, the second plate and the insulating material layer are each 0.8 mm to 1.5 mm.

According to an exemplary embodiment, there is provided a display device comprising: a display panel; and a back panel assembly according to any one of the above mentioned embodiments. The display panel is positioned on a side of the first plate of the back panel, and the circuit board is configured to control the display panel.

According to an exemplary embodiment, the circuit board is a flexible circuit board connected to the display panel, and the circuit board is fixed to the exposed portion of the insulating material layer by bending toward the second plate.

According to an exemplary embodiment, the circuit board is connected to the display panel through a flexible connector.

According to an exemplary embodiment, the exposed portion of the insulating material layer is adjacent to an edge of the back panel.

According to an exemplary embodiment, the circuit board is configured to control the display panel wirelessly.

BRIEF DESCRIPTION OF THE DRAWINGS

The embodiments of the present disclosure will now be described by way of example with reference to the accompanying drawings in which.

DETAILED DESCRIPTION OF EMBODIMENTS

Figure 1:
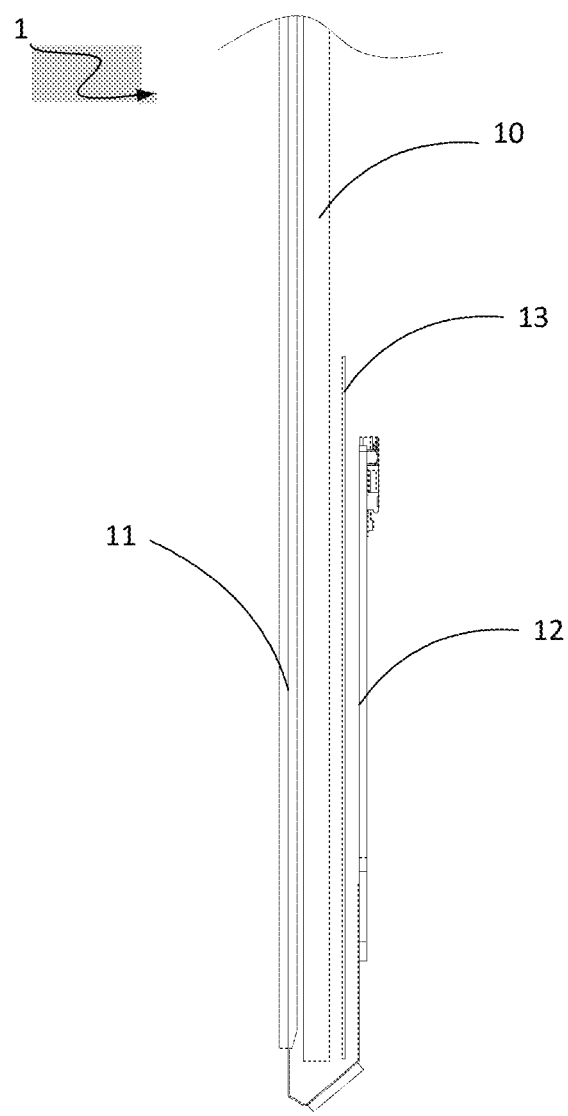
FIG. 1 is a schematic diagram of a method for mounting a circuit board to a back panel according to the related art.

The objects, advantages and advantages of the present disclosure will become more apparent from the following description of embodiments of the present disclosure when taken in conjunction with the accompanying drawings. It is to be understood that the following description of the embodiments is intended to be illustrative and explanations of the general inventive concept of the invention and should not be construed as limiting the invention. In the specification, like or similar reference numerals refer to like or similar parts or components.

The terms "upper", "lower", "left", "right", "top" or "bottom", etc., as used herein, refer to the orientations presented in the drawings, and should not be construed as limiting the invention.

FIG. 1 schematically illustrates a method for mounting a circuit board onto a back panel in the related art. As shown in FIG. 1, the display device 1 includes a back panel 10, a display panel 11 mounted on the back panel, and a circuit board 12 led out from the display panel 11 and fixed to the back side of the back panel 10. In a case where the back panel is made of a metal material or a certain conductive composite material (such as a metal composite material, a carbon fiber composite material, etc.), the electronic components and wirings provided on the circuit board may face a risk of short circuit. In order to solve this problem, the display device 1 further comprises an insulating material plate or an insulating material layer 13 disposed between the back panel and the circuit board. The insulating material layer 13 is formed, attached or bonded onto the back panel 10, and the circuit board 12 is adhered to the insulating material layer 13, such that a short circuit, which would otherwise be caused due to the direct contact between the back panel 10 and the circuit board 13, is avoid.

Figure 2:
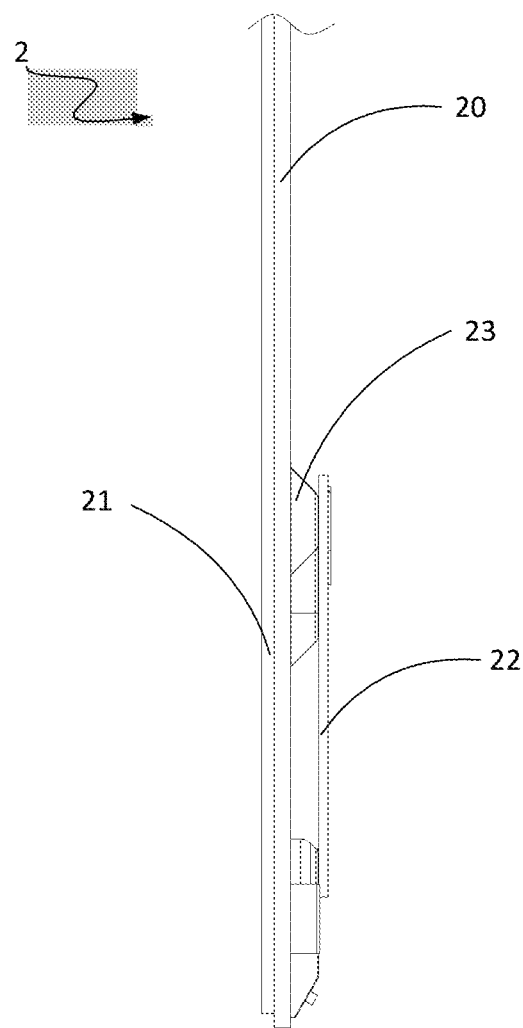
FIG. 2 is a schematic diagram of another method for mounting a circuit board to a back panel according to the related art.

FIG. 2 schematically illustrates another method for mounting a circuit board to a back panel in the related art. As shown in FIG. 2, the display device 2 includes a back panel 20, a display panel 21 mounted on the back panel, and a circuit board 22 led out from the display panel 21 and fixed to the back side of the back panel 20. In order to fix the circuit board 22, a fixing device 23 is provided between the back panel 20 and the circuit board 22. The fixing device 23 may include, for example, a riveted stud or the like. However, if there are not any welded elements or wirings in the circuit board 22 which are exposed to the outside, such a mounting method will result in an increase in the distance between the circuit board and the back panel, thereby resulting in an increase in the thickness of the entire display device. If the circuit board 22 has any welded elements or wirings which are exposed to the outside, it is still necessary to provide an insulating material layer between the back panel and the circuit board.

Figure 3:
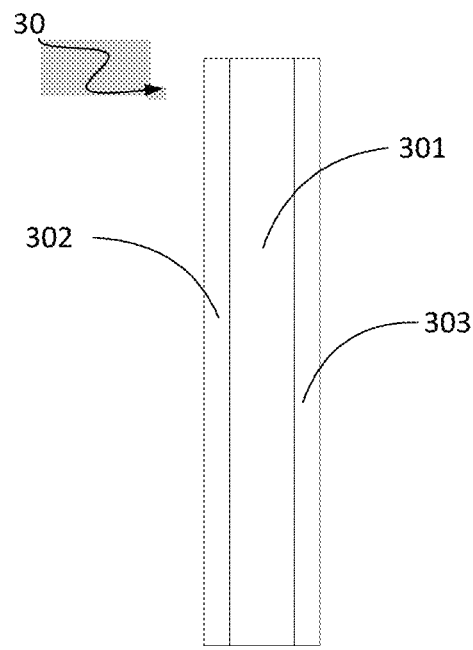
FIG. 3 is a schematic diagram of a basic structure of a back panel of a back panel assembly according to an embodiment of the present disclosure, which shows a multi-layer composite structure of the back panel.
Figure 4:
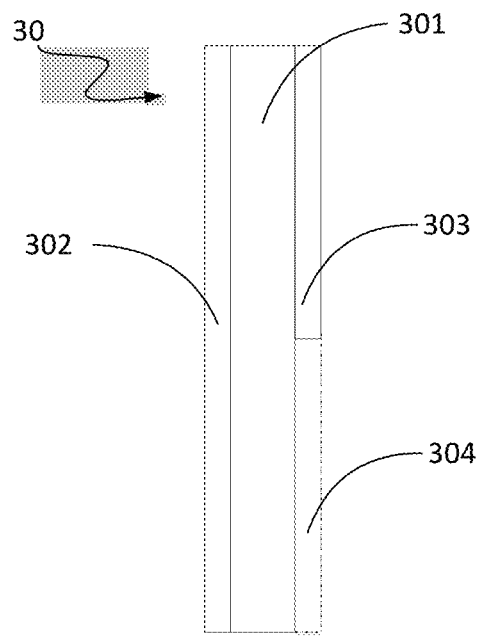
FIG. 4 is a schematic diagram of a back panel of a back panel assembly according to an embodiment of the present disclosure, which shows an exposed portion of an insulating material layer of the back panel.

In order to provide a back panel with a proper structural strength and to enable an insulation effect by the back panel itself, it is conceived in the present disclosure to manufacture a back panel of a display device from a composite material plate (laminated plate) as shown in FIGS. 3 and 4. As shown in FIG. 3, the laminated plate 30 includes a first plate 302, a second plate 303, and an intermediate layer 301 located between the first and second plates. The first plate 302 and the second plate 303 serve to provide structural strength, and the intermediate layer 301 is typically a functional layer which is configured to provide a desired performance. However, if such a laminated plate is simply used to manufacture a back panel of a display device, since the first and second plates are usually made of a metallic material or other conductive material, it is necessary to provide an insulating layer between the circuit board and the laminated plate. This will not help to reduce the thickness of the display device.

As shown in FIG. 4, in order to manufacture the back panel of the display device with the laminated plate, it is envisaged in an embodiment of the present disclosure that a portion 304 of the second plate 303 may be cut off to expose a portion of the intermediate layer 301. At this time, if the intermediate layer 301 is made of an electrically insulating material, the circuit board may be mounted at the position of the cut portion 304 so that the insulation between the back panel and the circuit board can be achieved, and the thickness of the display device will not be increased.

On basis of such a creative concept, the embodiment of the present disclosure provides a back panel assembly and a display device having such a back panel assembly.

According to the back panel assembly and the display device of the present disclosure, since the circuit board is mounted to the insulating material layer of the composite back panel, it is possible to avoid a short circuit phenomenon from occurring in the circuit board due to the contact of the circuit board with the conductive material on the back panel. In addition, since the circuit board can be entirely or at least partially provided in the space of the cut-out portion of the second plate of the back panel. Therefore, when the back panel assembly is applied to the display device, the thickness of the entire display device can be sufficiently reduced, thereby satisfying the requirement of thinning the display device.

Figure 5:
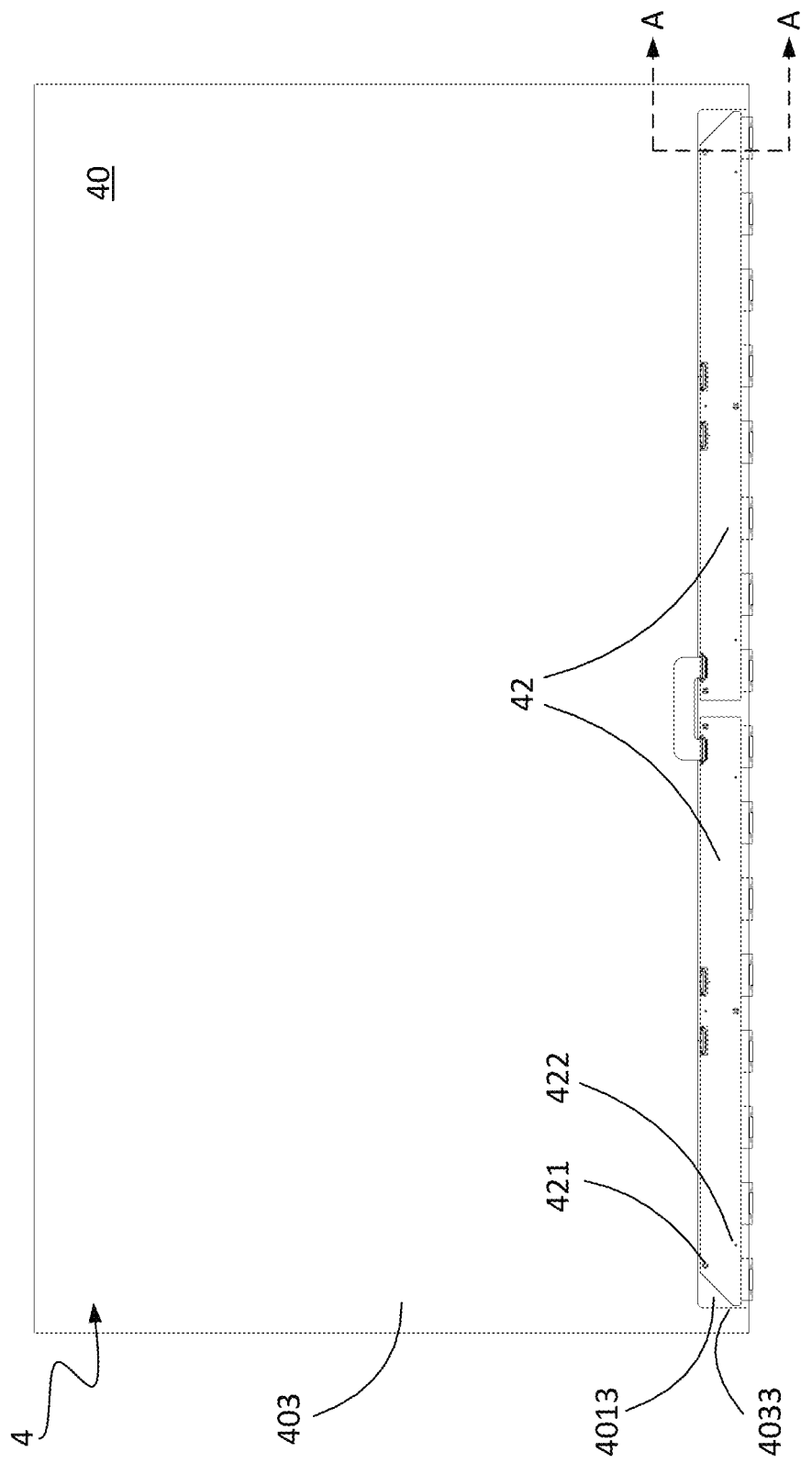
FIG. 5 is a rear schematic diagram of a display device according to an embodiment of the present disclosure.
Figure 6:
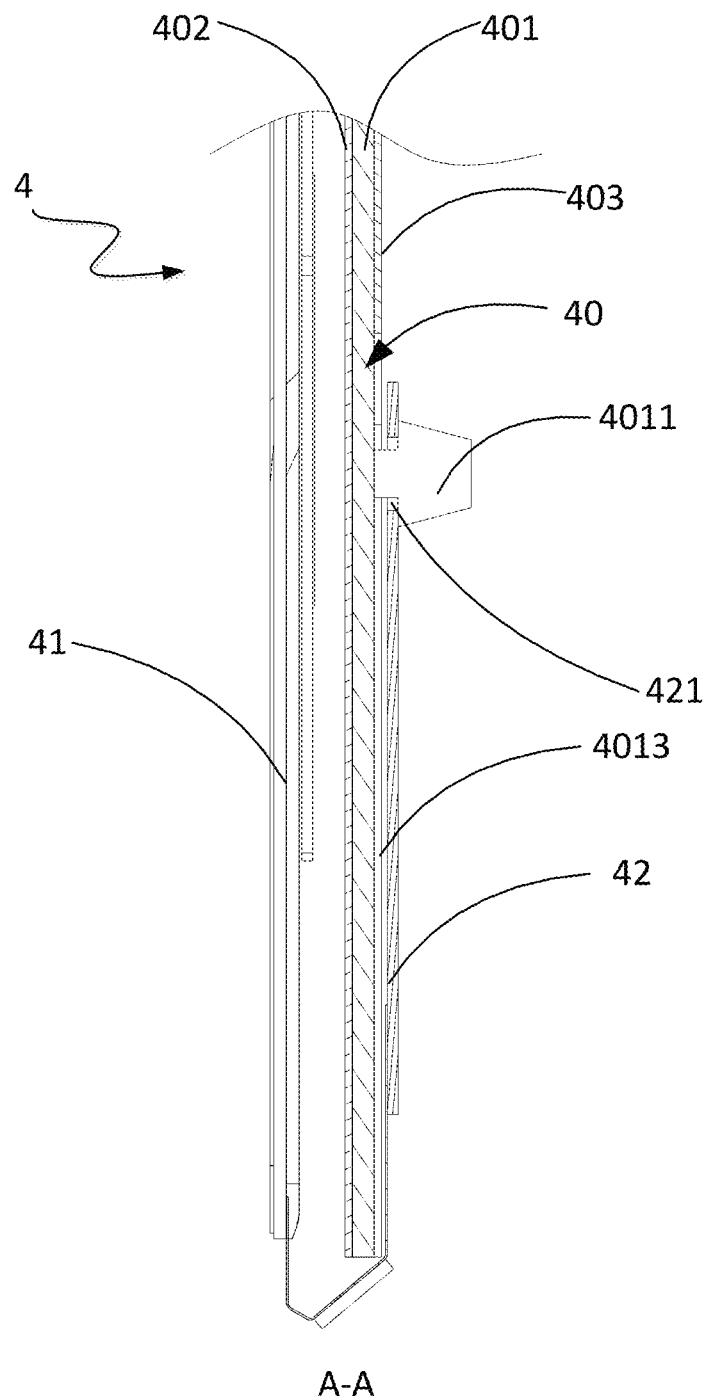
FIG. 6 is a partial cross-sectional view taken along the line A-A in FIG. 5.

In accordance with one aspect of the present disclosure, there is provided a back panel assembly. FIG. 5 is a rear schematic diagram of a display device 4 according to an embodiment of the present disclosure. FIG. 6 is a partial cross-sectional view taken along the line A-A in FIG. 5.

As shown in FIGS. 5 and 6, according to this embodiment of the present disclosure, the back panel assembly includes a back panel 40 and a circuit board 42 disposed on the back panel 40. The back panel 40 includes a first plate 402, a second plate 403 opposite to the first plate, and an insulating material layer 401 interposed between the first plate 402 and the second plate 403. The second plate 403 includes a cutout portion 4033 such that the insulating material layer 401 includes an exposed portion 4013 that is not covered by the second plate 403; and the circuit board 42 is mounted on the exposed portion 4013 of the insulating material layer 401. The cutout portion may be, for example, an opening portion formed in the second plate 403 or a notch portion formed at the edge of the second plate.

In this embodiment, it can be seen that, with reference to FIGS. 5 and 6, a portion of a lower part of the second plate 403 on a back side (right side in FIG. 6) of the back panel 40 is cut off so that the portion (exposed portion) 4013 of the insulating material layer 401 can be seen in FIG. 5, thereby the circuit board 42 can be mounted on the exposed portion 4013 of the insulating material layer 401, preventing the circuit board 42 from contacting the second plate 403 of the back panel 40 which is possibly conductive.

By using the back panel assembly of this embodiment, since the circuit board 42 is mounted onto the insulating material layer 401 of the back panel 40, it is possible to prevent a short-circuit of the circuit board 42 which would otherwise be caused due to its contact with the conductive material on the back panel 40. In addition, since the circuit board 42 can be entirely or at least partially disposed in the space of the cut-out portion of the second plate 403 of the back panel, the thickness of the entire display device will be sufficiently reduced when such aback panel assembly is applied to a display device, thereby meeting the requirement for thinning the display device.

Normally, the exposed portion of the insulating material layer 401 of the back panel 40 may be located at any position on the back panel. However, in view of the application of the back panel assembly in the display device and the connection of the circuit board to the display panel, the position of the exposed portion may be set according to the actual situation, which will be described in detail hereinafter.

In addition, the shape and area of the exposed portion of the insulating material layer may be determined according to the shape and area of the circuit board. In general, the exposed portion of the insulating material layer is of the same shape as that of the circuit board, and the area of the exposed portion is slightly larger than the area of the circuit board. As shown in FIG. 5, the shape of the exposed portion of the insulating material layer 401 and the shape of the circuit board 42 are both elongated, and the area of the circuit board 42 is slightly smaller than the area of the exposed portion 4013 so that after the circuit board is mounted, an appropriate gap is left between the circuit board and the second plate 403 to avoid direct contact therebetween. Of course, if the periphery of the circuit board itself is made of an insulating material or has been subjected to an insulation treatment, the area of the circuit board may be equal to the area of the exposed portion of the insulating material layer.

Figure 7:
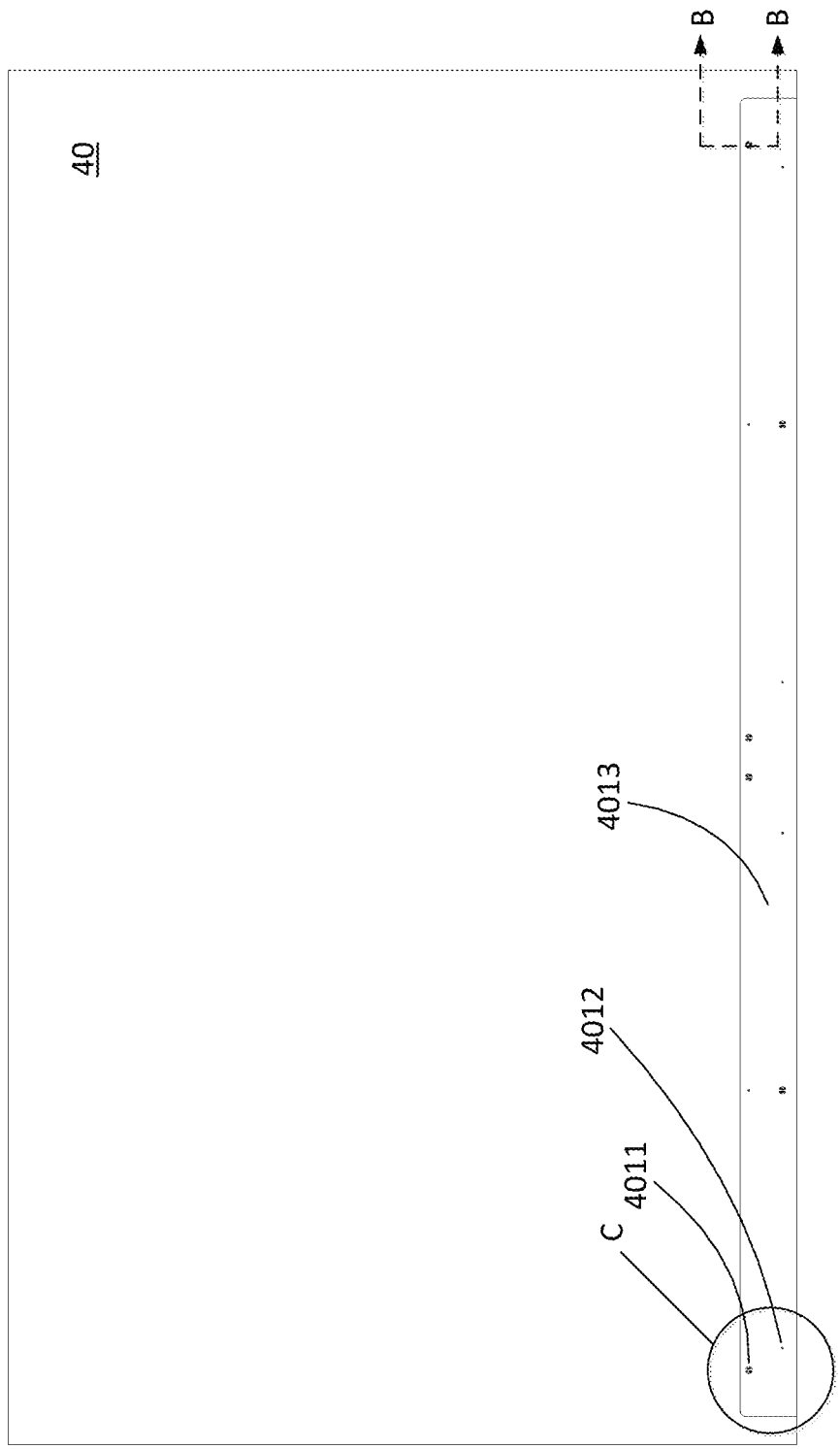
FIG. 7 is a rear schematic diagram of a back panel of a display device according to an embodiment of the present disclosure.
Figure 8:
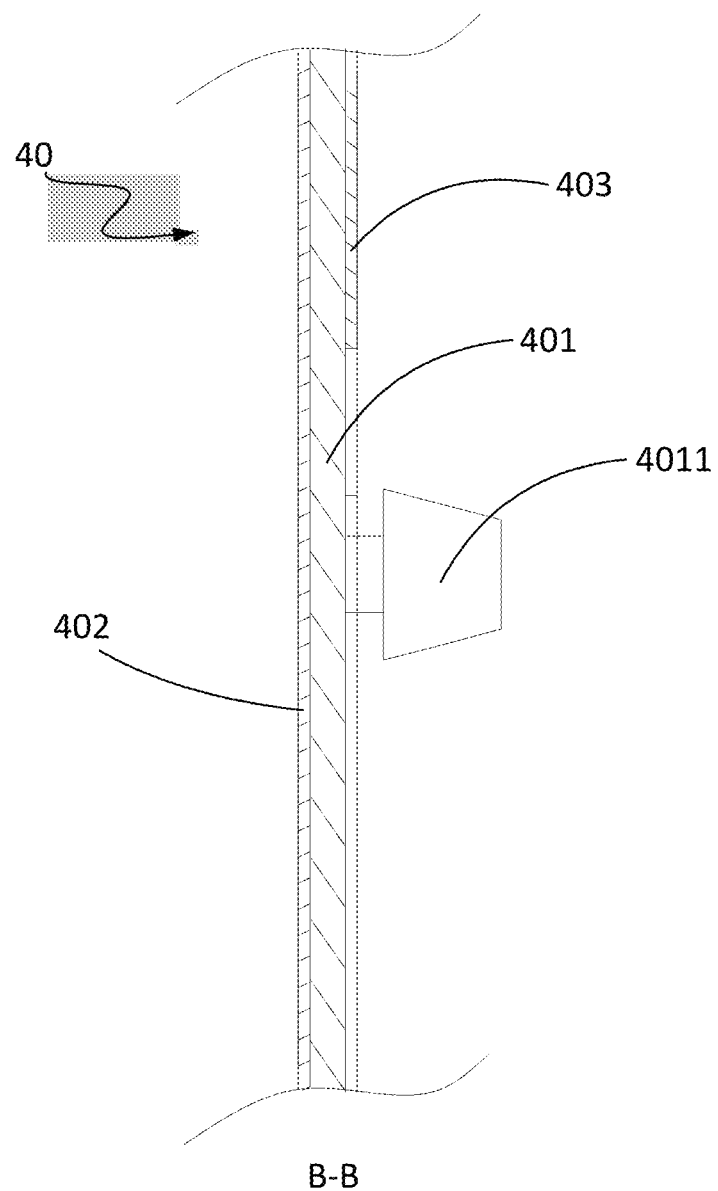
FIG. 8 is a partial cross-sectional view taken along the line B-B in FIG. 7.
Figure 9:
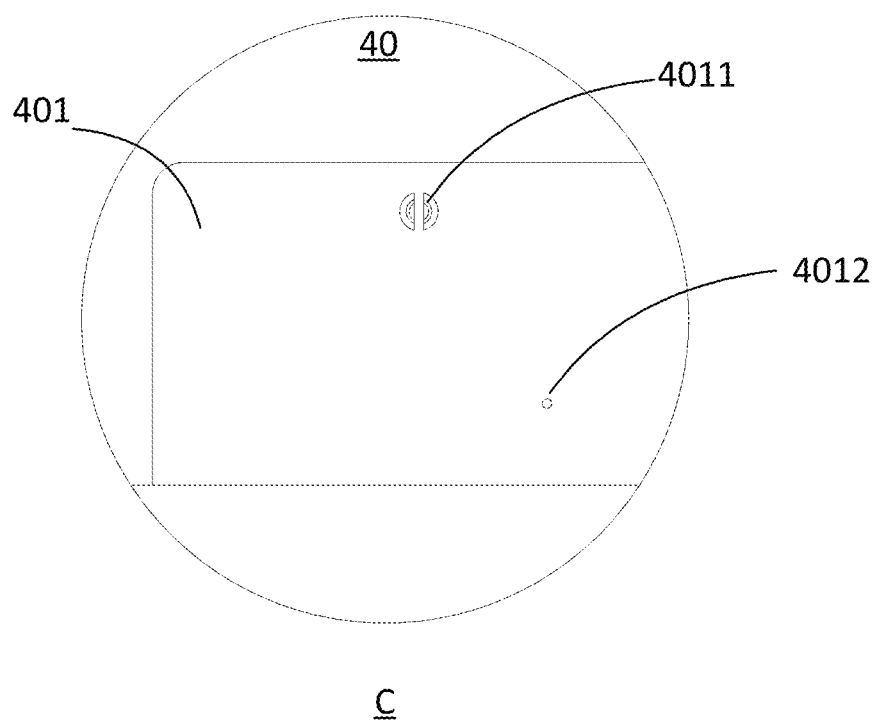
FIG. 9 is a enlarged schematic diagram of the portion C in FIG. 7.

FIGS. 7-9 show schematic diagrams of a back panel of a back panel assembly according to an embodiment of the present disclosure, in which FIG. 7 is a rear schematic diagram of a back panel of a display device according to an embodiment of the present disclosure; FIG. 8 is a partial cross-sectional view taken along the line B-B in FIG. 7; and FIG. 9 is a partial enlarged schematic diagram of the portion C in FIG. 7.

According to an exemplary embodiment, a fixing member 4011 configured to fix the circuit board 42 may be formed on the exposed portion 4013 of the insulating material layer 401 in order to mount and fix the circuit board. For example, the fixing member 4011 includes a snap structure, and the circuit board 42 is provided with a first hole 421 which cooperates with the snap structure (see FIG. 6). With the above-described structure, the circuit board can be easily assembled and disassembled.

The numbers of the fixing member 4011 and the corresponding first hole 421 are each at least one, and optionally two. The two first holes may be provided at positions near the left and right edges of the circuit board respectively. Of course, more fixing members 4011 and the first holes 421 which cooperate with each other may be provided as necessary (for example, depending on the length of the circuit board, etc.). The insulating material layer may be made of, for example, plastic, and therefore the fixing member may be an integral member or portion which is formed directly (for example, molded) on the insulating material layer made of plastic.

In other embodiments which are not shown, it is possible to fix the circuit board in other forms. For example, the circuit board may be fixed by applying an adhesive on the exposed insulating material layer, or, by provide holes with corresponding positions both in the circuit board and in the back panel, and inserting external snap fixing members into the holes in the circuit board and the back panels, and so on.

In an exemplary embodiment, as shown in FIG. 9, a positioning member 4012 configured to position the circuit board is also formed on the exposed portion of the insulating material layer. The positioning member includes, for example, a columnar protrusion, and the circuit board is provided with a second hole 422 for cooperating with the columnar protrusion (FIG. 5). Similarly, the numbers of the positioning member 4012 and the corresponding second aperture 422 may be set as desired (e.g., according to the length of the circuit board, etc.). It is also possible to provide a plurality of cooperating fixing members 4011 and second holes 421. For example, six fixing members 4011 and six positioning members 4012 are shown in FIG. 7, and therefore, as shown in FIG. 5, six first holes 421 and six second holes 422 are provided in the circuit board 5. Generally, as shown in FIG. 5, the first holes 421 and the second holes 422 are provided at an edge portion or a corner portion of the circuit board which does not affect the circuit arrangement. Therefore, the fixing member 4011 and the positioning member 4012 are also provided on corresponding locations on the insulating material layer.

A good positioning and fixing of the circuit board can be achieved by providing a fixing member and a positioning member on the exposed portion of the insulating material layer of the backing panel, and providing the first hole and the second hole on the circuit board which cooperate with them, such that the circuit board will not accidentally contact the second plate which may be conductive and on the outside of the backing panel, thereby reducing the risk of short circuit of the circuit and the device on the circuit board.

According to another aspect of the present disclosure, there is provided a display device. According to an exemplary embodiment, as shown in FIGS. 5 and 6, the display device 4 includes a display panel 41 and a back panel assembly as described above; in an example, the display panel 41 is positioned or disposed near the side of the first plate 402 of the back panel 40, and the circuit board 42 is configured to control the display panel 41.

In the exemplary embodiment, as shown in FIG. 6, the circuit board 42 may be a circuit board led out from the display panel 41. Of course, the circuit board 42 may also be an independent circuit board, and the operation of the display panel may be controlled with wireless communication technology. According to an exemplary embodiment, the circuit board 42 may be a flexible circuit board fabricated by the Chip On Film (COF) process, which is connected to the display panel 41 and is fixed to the exposed portion 4013 of the insulating material layer 401 by bending towards the second side of the back panel (the side where the second plate 403 is located). According to another exemplary embodiment, the circuit board 42 may be connected to the display panel 41 through a flexible connection (e.g., wiring), while the circuit board itself is not necessary to be flexible.

Generally, for example, in order to facilitate the fixing of the circuit board, the exposed portion 4013 of the insulating material layer 401 of the back panel 40 is located adjacent to the edge of the back panel, as shown in FIG. 6. In this way, when the circuit board 42 is led out from the display panel 41 and bent, it may be directly fixed to the exposed portion 4013, so that the manufacturing cost of the circuit board may be reduced and the mounting and fixing operation of the circuit board may be facilitated. However, depending on different circuit designs of the display panel, the exposed portion of the insulating material layer 401 of the back panel 40 may also be provided at other positions on the back panel or only occupies a portion of a lower edge portion of the back panel. FIG. 6 shows an exemplary embodiment in which the circuit board 42 is led out from the lower side of the display panel 41 and bent toward the second plate 403 of the back panel 40 and fixed to the exposed portion of the back panel 40. In another exemplary embodiment, if the circuit board 42 controls the display panel 40 wirelessly, the exposed portion 4013 of the insulating material layer of the back panel 40 may be located at any positions on the back side (right side in FIG. 6) of the back panel.

According to an embodiment of the present disclosure, the first plate 402 and the second plate 403 of the back panel 40 are generally made of a material having sufficient structural strength and the intermediate insulating material layer 401 is made of an insulating material which is light as much as possible. In order to ensure that the entire back panel has a sufficient structural strength while the thickness thereof is reduced as much as possible, for example, the first plate 402 and the second plate 403 are made of a metal or an alloy such as an aluminum, an aluminum alloy, a magnesium alloy, an aluminum-magnesium alloy, a stainless steel or the like, or may be made of a structural material such as a carbon fiber composite material, and the thicknesses of the first plate 402 and the second plate 403 may be adjusted according to the actual size of the back panel, and generally, are between 0.8 mm and 1.5 mm, for example 0.8 mm, 1.0 mm, 1.2 mm, 1.5 mm or the like. The thicknesses of the first and second plates may be designed to be the same as or different from each other as desired. For example, the insulating material layer 401 may be made of a polymer material having better insulating properties. For example, the insulating material layer 401 may be made of a material selected from a group consisting of polycarbonate (PC), acrylonitrile-butadiene-styrene copolymer (ABS), polyethylene (PE), a mixture of PC and ABS, a mixture of PVC and ABS, a mixture of NYLON and ABS, PC and glass fiber composite materials and the like, and the specific thickness can be selected according to the actual size of the back panel. Commonly used thickness is between 0.8 mm to 1.5 mm, for example, it may be 0.8 mm, 1.0 mm, 1.2 mm, 1.5 mm or the like, and the thickness of the insulating material layer may be the same as or different from the thickness of the first plate or the second plate.

According to the display device of the embodiment of the present disclosure, since the circuit board is mounted on the insulating material layer of the composite back panel, it is possible to avoid occurrence of the short circuit phenomenon due to the contact of the circuit board with the conductive material on the back panel. In addition, the circuit board may be entirely or at least partially provided in the space of the cut-out portion of the second plate of the back panel, thus when the back panel assembly is applied to a display device, the thickness of the entire display device can be sufficiently reduced, thereby meeting the requirement of thinning of the display device. Further, with corresponding designs of fixing and positioning structures, it is possible to simplify the assembly and disassembly process of the circuit board, shorten the assembly time, reduce the assembly distance, and avoid the use of additional fixing tools and components.

Although several exemplary embodiments have been shown and described by way of examples, it would be appreciated by those skilled in the art that various changes or modifications may be made in these embodiments without departing from the principles and spirit of the disclosure, and all these changes or modifications shall fall within the scope of the present invention, which is defined in the claims and their equivalents.

What is claimed is:

1. A display device comprising:
   a display panel; and
   a back panel assembly comprising:
     a back panel; and
     a circuit board disposed on the back panel;
   wherein the back panel comprises:
     a first plate;
     a second plate opposite to the first plate; and
     an insulating material layer interposed between the first and second plates,
   wherein the second plate comprises a cutout portion such that the insulating material layer comprises an exposed portion exposed by the cutout portion,
   wherein the circuit board is disposed on the exposed portion of the insulation material layer,
   wherein a fixing member is formed on the exposed portion of the insulation material layer and configured to fix the circuit board, and
   wherein the fixing member comprises a snap structure, and the circuit board is provided with a first hole cooperating with the snap structure, the fixing member being made of a same material as that of the insulating material layer and being formed integrally with the insulating material layer by molding,
   wherein the display panel is positioned on a side of the first plate of the back panel, and the circuit board is configured to control the display panel.

2. The display device according to claim 1, wherein the circuit board is a flexible circuit board connected to the display panel, and the circuit board is fixed to the exposed portion of the insulating material layer by bending toward the second plate.

3. The display device according to claim 1, wherein the circuit board is connected to the display panel through a flexible connector.

4. The display device according to claim 2, wherein the exposed portion of the insulating material layer is adjacent to an edge of the back panel.

5. The display device according to claim 2, wherein the circuit board is configured to control the display panel wirelessly.

6. The display device according to claim 1, wherein a positioning member is also formed on the exposed portion of the insulating material layer and configured to position the circuit board.

7. The display device according to claim 6, wherein the positioning member comprises a columnar protrusion, and the circuit board is provided with a second hole cooperating with the columnar protrusion.

8. The display device according to claim 1, wherein the first and second plates are each made of a conductive material.

9. The display device according to claim 1,
   wherein materials of the first and second plates are any one selected from a group consisting of aluminum, aluminum alloy, magnesium alloy, aluminum magnesium alloy, stainless steel, carbon fiber composite material, and any combination thereof; and
   wherein the material of the insulating material layer is any one selected from a group consisting of polycarbonate (PC), acrylonitrile-butadiene-styrene copolymer (ABS), polyethylene (PE), a mixture of PC and ABS, a mixture of polyvinyl chloride (PVC) and ABS, a mixture of NYLON and ABS, a composite material of PC and fiberglass, and any combination thereof.

10. The display device according to claim 1, wherein thicknesses of the first plate, the second plate and the insulating material layer are each 0.8 mm to 1.5 mm.

* * * * *